INVENTOR.
DAVID C. KALBFELL
BY
George E. Pearson
ATTORNEY

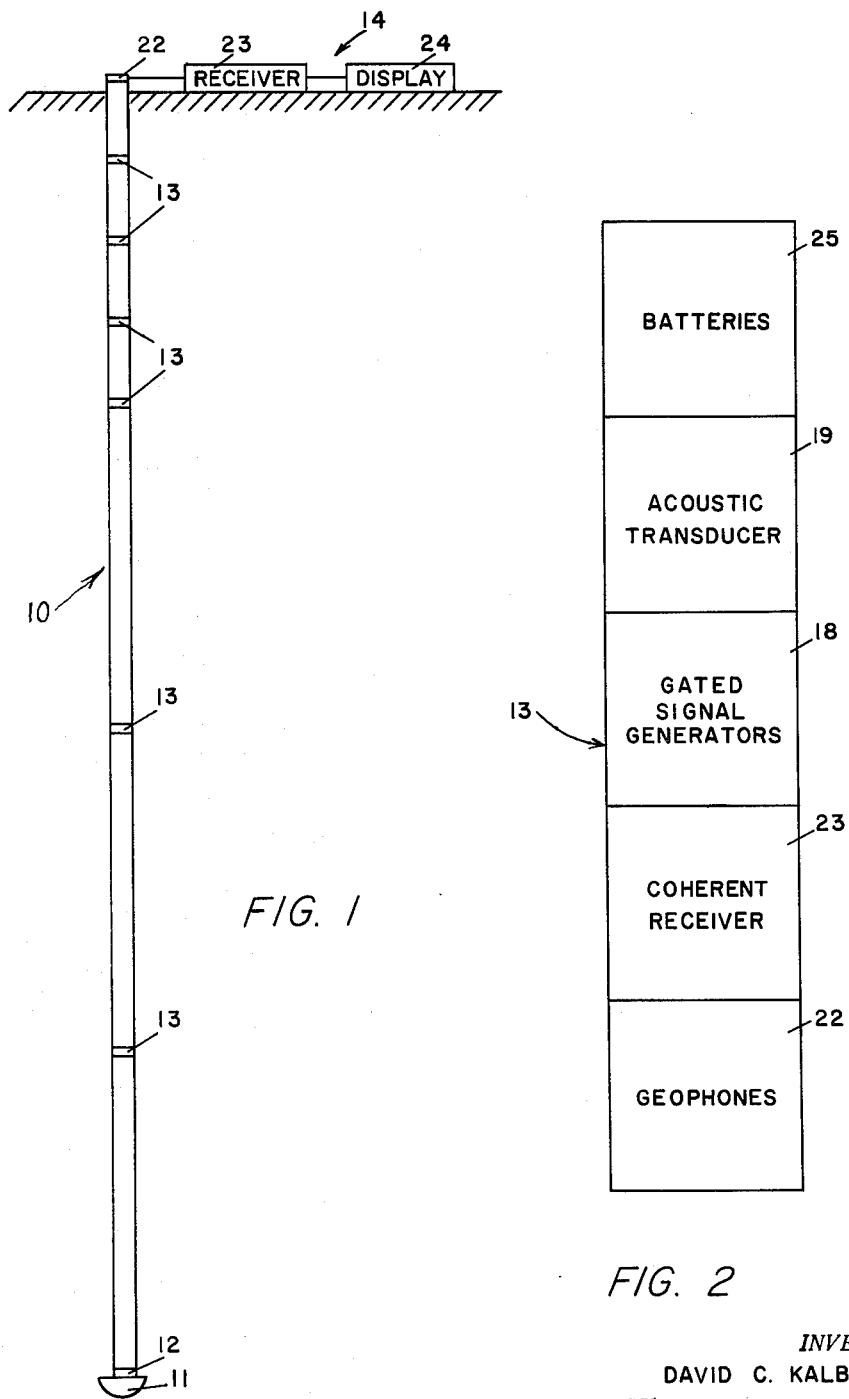

INVENTOR.
DAVID C. KALBFELL
BY
George E. Pearson
ATTORNEY

United States Patent Office 3,205,477
Patented Sept. 7, 1965

3,205,477
ELECTROACOUSTICAL LOGGING WHILE DRILLING WELLS
David C. Kalbfell, 941 Rosecrans St., San Diego, Calif.
Filed Dec. 29, 1961, Ser. No. 163,109
22 Claims. (Cl. 340—18)

This invention relates generally to the art of oil well drilling and logging and more particularly to new and improved electroacoustical methods and systems of logging while drilling.

In logging of oil wells, it is customary to sense and measure a plurality of parameters of interest in the well such, for example, as electrical conductivity, the velocity of sound, and nuclear radiation of the earth formation; and through interpretation of such measurements, as a result of long experience, it is possible to determine whether the same are favorable to the presence of a valuable oil producing stratum.

Heretofore, in accordance with certain methods, measurements of the oil well parameters have been made, after first removing the drill pipe from the well, by inserting a measuring capsule which transmits the measured information up to the surface through wires. Such logging operations necessarily are slow, time consuming, expensive, and the information thus received is not only frequently insufficient but too late to be useful in guiding the drilling operation.

In view of these disadvantages certain continuous logging while drilling methods have heretofore been proposed such, for example, as those disclosed in Patent 2,810,546 issued to B. G. Eaton et al. and Patent 2,380,520 issued to G. L. Hassler.

In the drill tool telemetering system disclosed in Patent 2,810,546, acoustical oscillators disposed near the drilling tool at the bottom of the string are mechanically driven as by the flow of drill mud or by rotation of the drill pipe relative to the well wall to generate predetermined signal frequencies which are spaced in the frequency spectrum and modulated each by a sensed condition individual thereto such as pressure, temperature, torque, etc., on which information in the well is desired. These oscillators and related equipment are arranged around the wall of what is called an oscillator pipe section, and their modulated frequencies are transmitted acoustically to the surface via the drill pipe which serves as an acoustical transmission line. Acoustical receivers attached to the drill pipe string at or above the ground surface pass the signal frequencies via brushes to frequency discriminators or noise spectrum analyzers whose outputs are measured as by level meters to thus identify the desired information. It is recognized that acoustical noise arriving at the surface receivers cannot be identified as originating from any particular source and that the signal frequencies travelling up the drill pipe, therefore, must be accentuated sufficiently to be identifiable. The mechanically driven acoustic oscillators are the disclosed means for accomplishing this.

In the bore hole indicating apparatus of Patent 2,380,520, vibration signals in the form of alternate periods of sound and silence are caused to represent continuously measured electrical resistance of the formation and inclination of the bit and drill collar respectively and are transmitted through the mud fluid column or drill pipe for identification at the surface and translation into continuous curves drawn against depth. The disclosed transmitter apparatus for accomplishing this is incorporated in the drill collar or bit and comprises a 100 cycle horn which is periodically electrically energized by a mud turbine driven generator, and an electrical circuit responsive alternately to the magnitude of the resistivity and inclination variables to provide means for timing the periods of actuation and silence of the horn. Thus, when actuated, the horn sends sound pressure waves at about 100 cycles up the drill pipe and this transmission persists for intervals proportional to the resistivity of the formation. The periods of silence, on the other hand, are for intervals proportional to the inclination of the drill collar.

Thus, prior art logging while drilling methods as exemplified by the aforedescribed patents utilize energy inherently available in the drilling operation to generate sound wave signals at or near the drill bit for modulation in accordance with the magnitude of measured parameters of interest in the well and for transmission of the modulated sound signals up the drill pipe or mud to the surface for identification.

Insofar as applicant is aware, these systems have never proved to be practical or reduced to actual use although their teachings have been available for many years. Their main limitations stem from ineffective coupling of sound into the drill pipe, use of unsophisticated sound generator systems in which frequencies and rates are not carefully controlled, and rudimentary receiver systems which can detect a sound only when it is approximately as strong or stronger than the general noise associated with a drilling rig at the surface of the earth.

The Eaton Patent #2,810,546 uses no electricity, but depends entirely upon mechanical resonances which vary with temperature and pressure in addition to the parameter being measured. His frequency modulation requires continuous transmission over a separate band of frequencies for each variable, and does not lend itself to commutation of a large number of physical parameters. The physical size limitations of such resonators requires that they operate at frequencies which are so high that attenuation in the pipe would be particularly serious, which is one of the main reasons why this approach has not been successful.

The Hassler Patent #2,380,520 does employ electricity with a sonic horn, but this horn radiates sound into the mud instead of the pipe, and sound is seriously attenuated in the mud due to bubbles, etc. Although there would be some transference of energy from the mud to the pipe, this would be inefficient. The acoustic frequency employed, moreover, is subject to drift and would be difficult to detect at the surface in the presence of background noise.

It is the principal object of the present invention to obviate the aforedescribed difficulties of the prior art logging while drilling methods and systems, this being accomplished in accordance with the inventive concepts and features of the present invention and with the accompanying advantages, as more fully hereinafter set forth, by:

(1) Measuring and converting the parameters to D.C. voltages;

(2) Converting the D.C. voltages to digital form sequentially through a magnetic or electronic commutator;

(3) Electrically generating a coherently related and pre-arranged set of data frequencies and mates for electro-acoustical transmission of the digital information by frequency shift keying;

(4) Magnetostrictively or electrostrictively coupling and radiating the transmission signal frequencies into the drill pipe for efficient use of the same as the acoustic link to the surface;

(5) Reinforcing and transponding the transmission signal frequencies at intervals over the length of the drill pipe string;

(6) Reconstructing the keying frequency at the receiver from the received and coherently related signal frequencies;

(7) Integrating the received signal frequencies repetitively at the rate of the reconstructed keying frequency;

(8) Comparing the integrated signal frequencies each with the others at the end of each integrating period;

(9) Producing an output voltage for each of the integrated signal frequencies whenever its strength comparatively is greater than the others; and

(10) Recording the output voltages.

Thus, in the method and system of the present invention, the coherent decision making receiver need function only to determine which of the pre-arranged and coherently related signal frequencies is being received at any time. This combination leads to a practical method and system by which attenuation of sound in the transmission medium may be overcome and by which signals which are very small compared to the background noise may be detected and identified at the surface, thereby making it possible to extract useful data from deep wells concurrently with the drilling operation therein.

Other objects, features and advantages of the present invention will become more fully apparent from the following detailed description of the best mode thus far devised for practicing the principles thereof, reference being had to the accompanying drawings wherein:

FIG. 1 is a schematic view of a drill pipe string modified for the purposes of the present invention;

FIG. 2 is an enlarged view of one of the transponder pipe modules disclosed in FIG. 1;

Figure 3:
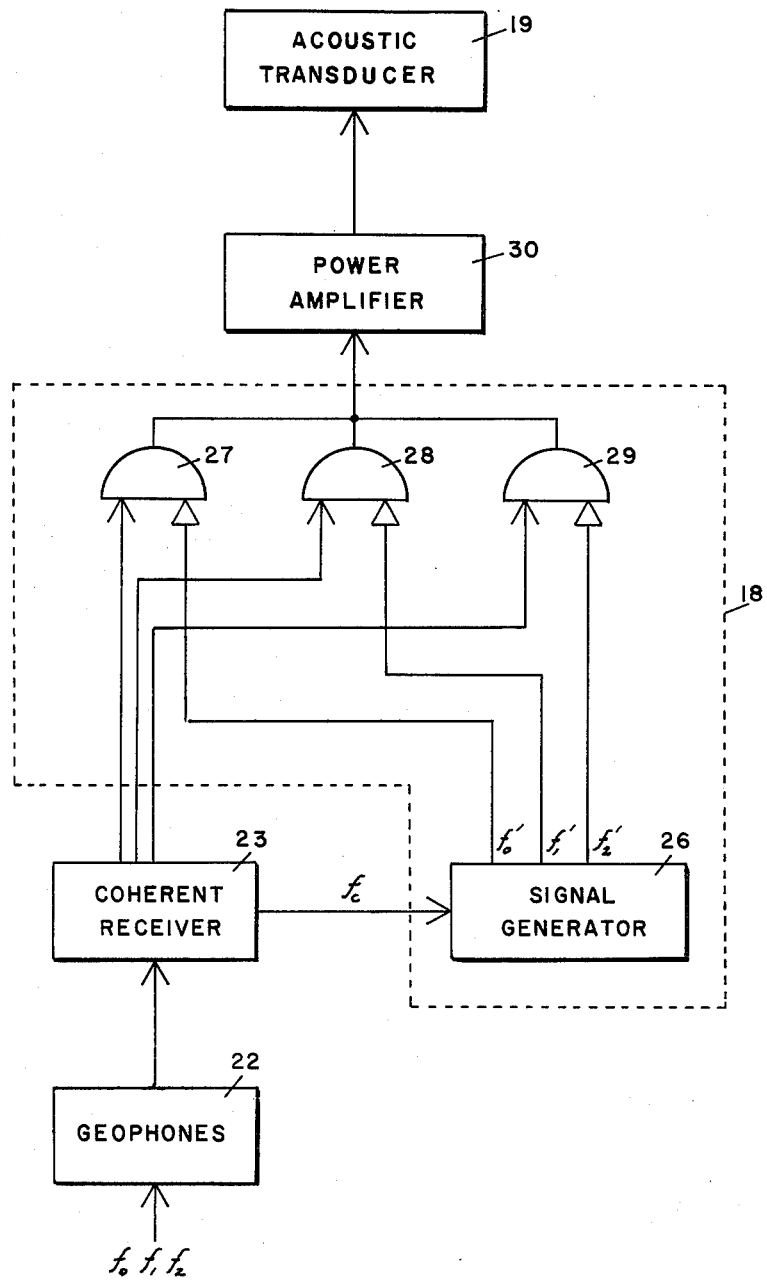
Figure 4:
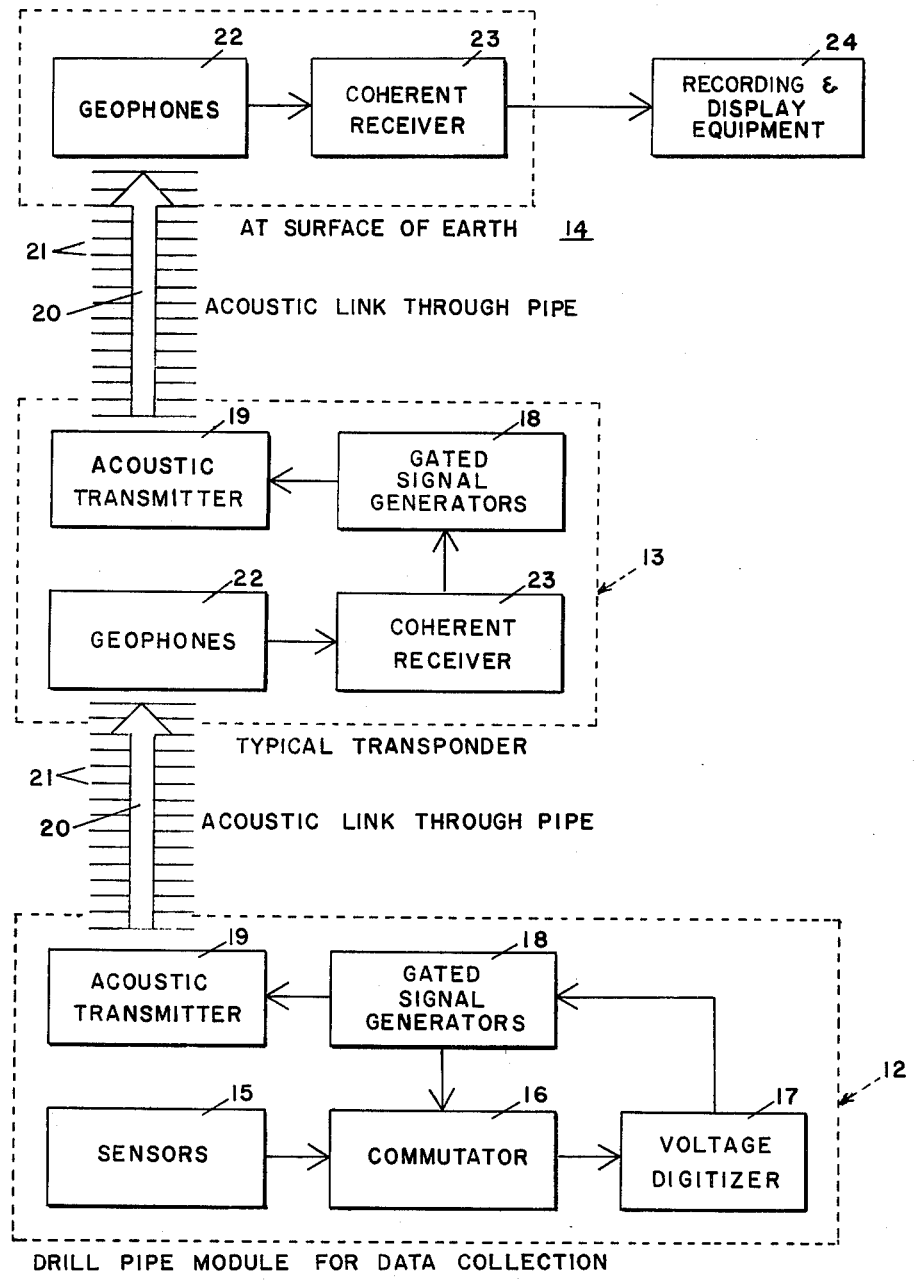
Figure 5:
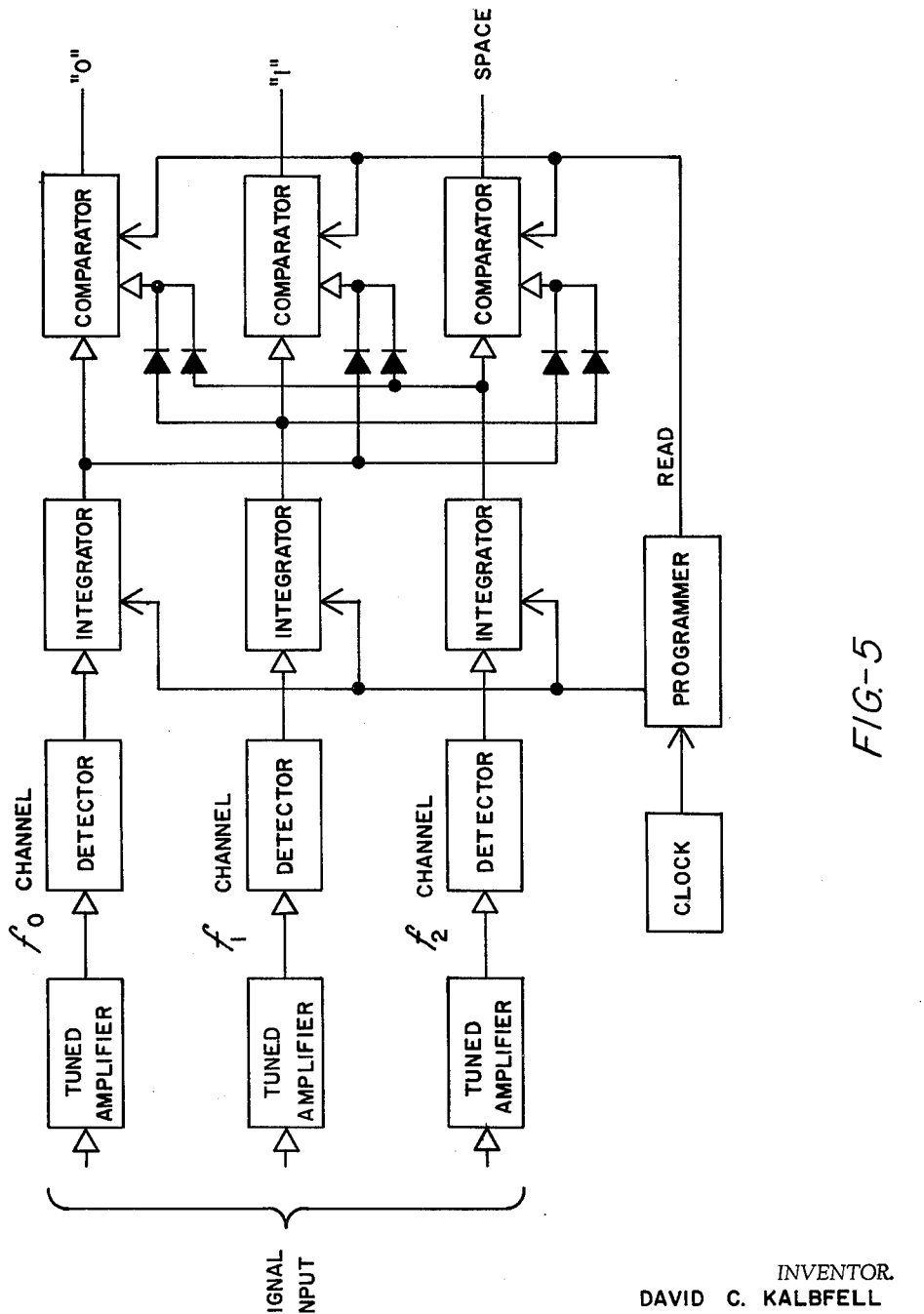
Figure 6:
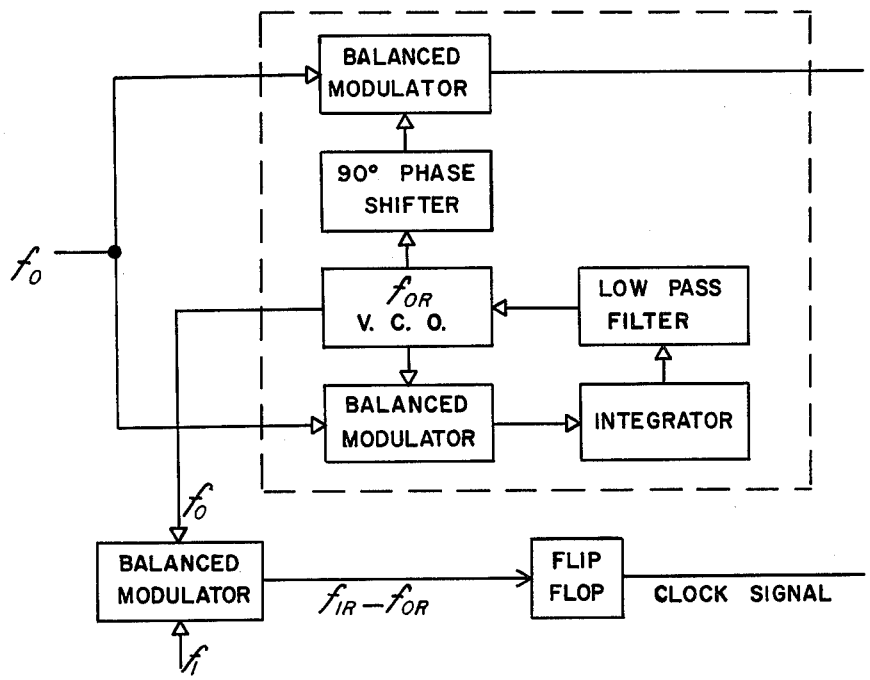

FIG. 3 discloses in block diagram form the complete electroacoustical system employed in the transponder pipe module of FIG. 2;

FIG. 4 discloses in block diagram form the complete electroacoustical system for practicing the logging while drilling method of the present invention;

FIG. 5 is a block diagram of the coherent receiver shown as a block in FIGS. 3 and 4;

FIG. 6 shows details of the detector and clock synthesizer of FIG. 5; and

Figure 7:
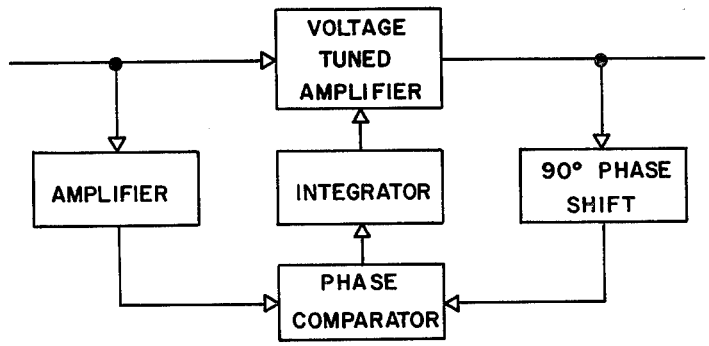

FIG. 7 shows a self tracking tuned amplifier for the input section of FIG. 5.

Referring now to the drawings for a more complete understanding of the invention, and first more particularly to FIG. 1, thereof, it will be seen that the numeral 10 generally designates a drill pipe string which comprises a plurality of pipe sections (not separately delineated) coupled together end to end with a drill tool or bit 11 disposed at the bottom of the string, all more or less in a conventional manner.

For the purposes of the present invention, however, the drill pipe string is modified to include and accommodate a transmitter pipe module unit 12 which is disposed at or near the drill bit 11 and a plurality of transponder pipe module units 13 which are distributed along the length of the drill string for a purpose subsequently explained herein. The modified drill string apparatus and the novel surface apparatus generally designated 14 together comprise the complete system, as disclosed in block diagram form in FIG. 4, for practicing the logging while drilling method of the present invention.

Referring now to FIG. 4, there is disclosed a drill pipe module for data collection and transmission which corresponds to the transmitter unit 12 and forms the subject matter of my copending application for Drill Pipe Module Data Collection and Transmission System, Serial No. 820,680, filed June 16, 1959, now Patent No. 3,015,801. Reference may be had to this application for details of construction and operation. It suffices, therefore, merely to state herein that this transmitter apparatus comprises a plurality of sensors 15 and associated apparatus for sensing and measuring a plurality of parameters of interest near the drill bit and converting these measurements to D.C. voltages. These sensors are sampled as by a magnetic commutator 16 and their measured voltages applied sequentially by the commutator to a voltage digitizer or encoder 17 for converting the analog voltages to digital form. A magnetic or electronic commutator is employed to increase the number of parameters being measured whereby hole temperature, pressure, mechanical resistance offered by the formation to the drill bit and other parameters may be measured in addition to those customarily measured such as electrical conductivity, the velocity of sound, and the intensity of nuclear radiation of the earth formation.

The voltage digitizer 17 thus provides a series of commutated signals corresponding to the measured parameters. These signals are repetitively transmitted via the drill pipe in frequency modulation or binary number form by means of frequency shift keying in a three frequency system in which frequencies $f_1$ and $f_0$ respectively correspond to the "1" and "0" digit signals and a frequency $f_2$ provides a "space" transmittal between each series of transmitted binary numbers to thus indicate at the receiver 14 completion of each cycle of analog voltage measurements.

Gate signal generators 18 produce the carrier frequencies $f_1$ and $f_0$ by heterodyning frequency $f_2$ with a basic clock frequency $f_c$. Frequency $f_c$ also serves to provide shift pulses required in the analog to digital conversion, commutation, and frequency shift keying. Coherence is maintained between signal frequencies $f_0$, $f_1$ and clock frequency $f_c$ so that the clock frequency may be reconstructed at the receiver by heterodyning the two signal frequencies $f_0$ and $f_1$, thus rendering the overall transmitter-receiver system independent of drift in the oscillators comprising the signal generator. Signal frequencies $f_0$, $f_1$, and $f_2$ drive a non-resonant transmitter transducer 19 of a type suitable for the purpose, such as that disclosed and claimed in my copending application for Drill Pipe Module Transmitter Transducer, Serial No. 39,633, filed June 29, 1960, now Patent No. 3,103,643.

Although reference is directed to this transmitter transducer application for details of construction and operation of the pipe module transmitter unit 12, it suffices to state herein that the sensors and associated transmitter circiutry and the transmitter transducer, together with suitable batteries, are mounted in one or more modules comprising sections of drill pipe each consisting of two concentric cylinders separated about 3/4 of an inch to provide chambers between the walls to accommodate the transmitter parts and components. In this arrangement, the inner cylinder serves both to support the module structure and parts and to provide the normal channel for passage of the drill mud through the drill pipe string. Externally, the drill pipe modules appear similar to any other piece of drill pipe and are handled by the drilling crew in the same manner.

In the aforedescribed transmission of intelligence to the surface of the earth via sound waves in the drill pipe, as indicated schematically by the arrows 20 and accompanying sound pressure lines 21 of FIG. 4, unique problems are presented in that the transducer 19 must generate frequencies at the lower end of the audible range (or even sub-audible frequencies), but it is impractical to take advantage of transducer resonance due to the very long wave lengths of the sound at these frequencies. Non-resonant transducers, moreover, are ordinarily not very efficient, and it becomes necessary to provide a drill pipe module transmitter transducer such as disclosed in my aforesaid application in which the various compliances and masses involved are easily controlled to avoid frictional losses and to minimize power loss at the free end of the pipe. A further problem arises in that the drill pipe module transmitter transducer must be extremely rugged to withstand the abuse of handling in the oil fields while still being very compliant to permit vibration at the very low frequencies involved. This requires that the compliant portions of the transducer be very soft within a normal elastic range corresponding to that of the transmission frequencies of interest, while being very strong with respect to rupture during transportation, installation, and drilling operations.

This is accomplished by the provision of an electroacoustical transducer in the form of a drill pipe module comprising two lengths of drill pipe which are bonded together end to end with an acoustically elastic cement and freely vibrated relative to each other at the transmission frequencies of interest by means of an electrovibratory member such, for example, as a magnetostrictive, electrostrictive, or like member, which bridges the compliant gap between the lengths of pipe and rigidly connects acoustically thereto near the contiguous and adjoining ends thereof.

The vibratory system thus constituted, including the joined sections of drill pipe, must be mass controlled: that is, the stiffness reactance of their compliant joint must be less than the mass reactance of the lower pipe section near the drill bit, the purpose of the compliant joint being to provide static coupling between the two sections of pipe while having a low impedance at the acoustic operating frequency so that the two sections of pipe are nearly floating freely with respect to the vibration.

By means of such novel transducer configuration and construction of parts and by use of elastic bonding materials having different stiffnesses in different areas of bonding between the parts, the optimum combination of ruggedness, compliance, and hermetic sealing against liquid is achieved while also providing a transducer structure which is readily fabricated and installed in the drill pipe. Novel provision, morever, is made for statically loading the electromechanical transducer during the process of assembling the parts comprising the transducer module. Specifically, in the assembly of a magnetostrictive transducer, the transducer member per se is secured to the lengths of pipe of the module while the same are forced to partially close the compliant gap therebetween. By reason of this arrangement, a transducer member of a type which contracts on application of electrical signals thereto, is initially expanded or pre-loaded when the initial forces on the lengths of pipe are released. The transducer member is thus stressed in the no signal condition and becomes further tensioned as the same is contracted in response to the applied signals. Novel means are also provided for strengthening the mechanical coupling between the pipe sections in the region of the compliant gap therebetween while also enhancing the magnetic characteristics of the flux path across the gap. In addition, novel means are provided for establishing electrical connections between the battery and electronics modules disposed at opposite ends of the transducer module and for sealing such connections from drill mud which passes through the inner tubular passage provided by these modules in maintaining continuity of the mud channel within the drill pipe.

Magnetostrictive transducers are low impedance devices and may be used advantageously with transistor circuitry. Electrostrictive transducers, on the other hand, are high impedance devices and may best be employed with vacuum tubes. Electrostrictive devices alternately expand and contract at the transmitter signal frequencies applied thereto, and accordingly, the acoustic waves transmitted through the drill pipe by an electrostrictive transducer are at the signal frequencies, being 49, 50, 51 cycles per second in the example of my copending transmitter application aforesaid. Magnetostrictive devices which are not biased either expand only or contract only on every half cycle of the applied signal frequencies and, accordingly, the frequencies of acoustic waves transmitted through the drill pipe by a magnetostrictive transducer are double those of the signal frequencies, the transmitted waves thus being at 96, 98, and 102 cycles per second for a magnetostrictive transducer operating in the system of the present invention.

By way of summary and directing of attention to essential detail, the drill pipe structure and apparatus 12 comprises upper and lower pipe sections coupled end to end as by an elastic adhesive coating between confronting end surfaces thereof to provide a joint having both structural integrity and acoustical compliance for free vibration of the joined pipe sections relative to each other at the frequencies of interest. An electronics module comprising the transmitter circuitry is disposed within the lower pipe section; a battery module is disposed within the upper section; and a transducer module is disposed and integrated within the pipe sections between the electronics and battery modules and in bridging relation to the compliant gap comprising the elastic joint between the pipe sections. These modules have supporting tubes individual thereto and aligned with respect to each other within the pipe sections, and these tubes form a central passage for the drill mud and also from nearly closed chambers between the modules for packing a sealant therewithin to seal against seepage of the drill mud into the modules. These chambers also have mutually slidable electrical contact means such as slip rings and engaging spring contact fingers disposed therewithin for interconnection of the modules disposed adjacent thereto. Means are provided on the pipe sections and complementary means are provided on the modules for mounting and assembling the same within the pipe sections and for preloading and rigidly connecting an electroacoustical transducer device or electrovibratory member to the pipe sections in bridging relation to the coupled ends thereof.

When the electrovibratory member is in the form of a magnetostrictive device, the same employs a tape wound core of magnetostrictive material mounted on a nonmagnetic bobbin such as may be formed of stainless steel, for example, the bobbin also serving to pass the drill mud, and the core having a winding wound thereon. The core near each end thereof is provided with an exterior threaded ring of magnetic material which is secured to the core, and the pipe sections respectively have threaded rings secured thereto and also formed of magnetic material for threaded engagement respectively with the rings of the core. These threads, as contrasted with the compliant gap between the pipe sections, are coated with an acoustically rigid adhesive. In order to pre-load the transducer, the pipe sections have their rings threaded while the sections are forced toward each other, thereby to compress the elastic compliant connection therebetween, and the core rings are screwed into the section rings individual thereto while the connection is similarly compressed whereby the core is tensioned when the forces on the pipe sections are released.

The pipe sections of the transducer are disposed respectively above and below the elastic connection comprising the compliant gap therebetween, and the mass in the lower pipe section is maximized by making the upper and lower connections of the core to the sections respectively near to and remote from the compliant gap, thereby to approximate a clamped condition of this end of the transducer. A clamped condition is desirable in order to avoid frictional losses within the transducer and thus obtain high efficiency of operation therefrom. The elastic connection in the compliant gap between the sections, moreover, is made such that the same has a stiffness reactance at the transmission frequencies which is less than or equal to the mass reactance of the lower pipe section in order that the stiffness reactance at the signal frequencies will be sufficiently low to avoid limiting of the amplitude of oscillation.

The elastic connection in the compliant gap also comprises a rigid band formed of magnetic material which together with the ring connections of the magnetostrictive core with the sections provides a low reluctance path for fluxes set up in the core upon energization of its winding. The band extends longitudinally in spaced parallel relation to longitudinally extending surfaces of the pipe sections, and the elastic adhesive coating of the gap is disposed therebetween with sufficient thickness and these surfaces are extended sufficiently to provide a stiffness and shear strength of the adhesive bond between the parts which exceeds the shock forces encountered in the service of the transducer in the drill string.

When the electrovibratory member is in the form of an electrostrictive device, the same comprises a ring of ceramic barium titanate which is bonded to the central stainless steel tube which, in addition to serving as the mud channel as before mentioned, also serves as one of the electrodes for the transducer ring. The ring has a second electrode bonded to the outer surface thereof and means disposed at the ends thereof for connecting the same rigidly acoustically to the pipe sections on opposite sides of the compliant gap.

The signal frequencies thus generated within the drill string and transmitted acoustically through the same serving as an acoustical link to the surface through the pipe sections, are received at the surface by a coherent decision making receiver system and apparatus which forms the subject matter of my copending application for Coherent Decision Making System and Method, Serial No. 147,422, filed October 20, 1961. A receiver system of this type is particularly useful when the signal is very weak compared to background noise such as encountered in a well drilling operation. The receiver system is therefore particularly well suited, although not restricted, for use with the logging while drilling system of the present invention.

In an ordinary communication system, the bandwidth needed to identify digital information at a given rate is well known. In my receiver system, however, a much narrower effective bandwidth may be used, because much of the intelligence has been transmitted by prearrangement, or can be established over a long period of time, and the receiver system thus need function, not as a frequency identifying device, but as a decision making device in determining which of known signal frequencies is received the strongest. To this end, novel amplifier means are provided for self adjustment of the frequency of maximum gain. By this means, the receiver is adapted to follow any drift in the transmitted frequencies and only a very narrow band width is required in the amplifiers. The received signal frequencies, moreover, are coherently related so as to be independent of drift and adaptable for use at the receiver in re-establishing the intelligence and basic clock frequencies originating at the transmitter.

Another important feature of my receiver system is that noise is largely balanced out. Thus, the combination of intelligence transmittal by pre-arrangement, extremely narrow bandwidth, coherence between frequencies, and noise cancellation makes my system much more sensitive than earlier ones.

As aforementioned, the receiver need only decide which of three frequencies is being transmitted at any given time. FIG. 5 shows it uses three identical channels, of equal bandwidth, tuned to the three aforementioned transmission frequencies $f_0$, $f_1$, and $F_2$ with phase locked detectors. These phase locked detectors shown in FIG. 6 contain local oscillators which serve to follow the transmitted frequencies with a very long time constant. By heterodyning these local oscillators against one another, the clock signal frequency is synthesized accurately in both frequency and phase. Thus, the receiver is able to establish the three intelligence frequencies and the clock, in spite of slow drifts, and these determinations are made over so long a period of time that noise is irrelevant.

The receiver now knows exactly when to make the decisions between the three frequencies, since the beginning and end of each bit has been established. Integrators at the output of each channel in FIG. 5 are started at the beginning of each bit, and their voltages compared at the end of the bit time. Since the channels are of equal bandwidth, noise makes the same contribution to each, and an extremely small signal level will suffice to indicate which of the three frequencies is being received.

Reference may be had to the aforesaid receiver system application for further details of construction and operation of the coherent decision making apparatus and circuitry involved. It suffices, therefore, merely to state herein that suitable geophones 22 are employed at the surface with the coherent decision making receiver which is designated 23, the two together comprising the subject matter of my receiver application aforesaid and, for this reason, being enclosed by the dashed lines in FIG. 4.

For the purposes of the present logging while drilling invention, one or more geophones 22 may be employed at the top of the drill string and connected as by slip rings, or alternatively, as by a suitable radio link, to the receiver 23. A single non-resonant geophone responsive to the three transmission frequencies may be employed. In a more sophisticated arrangement, however, three resonant geophones individual to the three signal channels and each resonant at one of the three signal frequencies received preferably are employed for maximum sensitivity.

The receiver 23 thus comprises three signal channels which are tuned to the three transmission signal frequencies and are made identical with equal band width whereby noise makes an equal contribution to each and cancels at the comparator, presently to be described, in each channel. A narrow band self tuning amplifier shown in FIG. 7 preferably is employed in each channel and comprises a voltage tuned amplifier having zero phase shift at that frequency where its gain is maximum and having voltage responsive means for varying the frequency of maximum gain. The voltage tuned amplifier also comprises a phase comparator which interconnects the input and output of the amplifier for varying the voltage to the voltage responsive means aforesaid in accordance with the difference in phase between the input and output, thereby to tune the amplifier to the frequency of the signal being received thereby.

Means interconnecting the signal channels of FIG. 5 is provided for reconstructing the keying frequency from the received signal frequencies, this means comprising a phase-locked signal detector as shown in FIG. 6 in each channel. This detector comprises a pair of balanced modulators connected in parallel in their channel to receive the channel signal frequency. One of these modulators produces a series of half cycles, the amplitude of which provides a measure of the strength of the channel signal frequency. The detector also comprises a voltage controlled oscillator which interconnects the balanced modulators and supplies a reference voltage to the second input of each. The detector further comprises a servo loop which interconnects the output of the other of the balanced modulators and the input of the voltage controlled oscillator to supply a voltage thereto to bring the oscillator frequency into phase with the channel signal frequency. The means for reconstructing the keying frequency also comprises a third balanced modulator which interconnects the oscillators of any two of the signal channels and serves to heterodyne the two oscillator frequencies thereby to coherently reconstruct the keying or basic clock frequency. The oscillator frequencies, being continuous, are preferred for reconstructing the keying frequency rather than the directly received signal frequencies which by their nature are not received continuously. The servo loop includes an integrator and a low pass filter and has a time constant sufficiently long to cancel the effect of noise.

Each of the signal channels of FIG. 5 comprises an integrator for accumulating the half wave output signals produced by its detector for a period of time determined by a programmer which is operated under control of the reconstructed clock or keying frequency. At the beginning of the receiving period for each bit of information, the programmer causes integrating capacitors to be short circuited momentarily, thereby starting the three integrators from zero voltage sumultaneously. Suppose that $f_0$ is being transmitted at a particular time. Then it is important that the integrators suppress any $f_0$ signal which appears on other channels, in addition to suppressing background noise. $f_0$ may be effectively suppressed in the $f_1$ and $f_2$ channels by a judicious choice of the integrating period. For example, if the three frequencies are 98, 100, and 102 cycles per second, then the integrating period should be an integral multiple of 0.5 second to give exact cancellation of the unwanted signals.

It was mentioned above that the voltage wave form between a detector and its integrator was a train of half sine waves which contained a direct current component when intelligence was present. There may also be a direct current component without intelligence, however, if the wrong integrating period is chosen, and this effect may be particularly serious if the integrating period is not long enough to contain a very large number of cycles. By choosing an integrating period equal to the reciprocal of the difference frequency between the incoming frequency and the reference frequency, however, this unwanted direct current component is exactly cancelled.

Each of the signal channels of FIG. 5 comprises a comparator which is used to determine which of the three integrators has acquired the largest voltage at the time that the "READ" command is given by the programmer. These comparators may be simple flip-flops whose supply power is provided under control of the programmer as a convenient means of operating on command. The comparison is made by applying signal from its parent integrator to one side of the flip-flop while signals from the two foreign integrators may be gated through diodes to the other side of the flip-flop. The comparator flip-flops of the three $f_0$, $f_1$, and $f_2$ signal channels thus respectively produce "0," "1" and "SPACE" output voltages whenever the voltage level of the integrated signal frequency of a particular channel is greater than that of the others.

In summary, there is thus provided a novel digital communication system employing coherently related frequencies which are selected by frequency shift keying at the transmitter, at a bit rate which is coherently related to the intelligence frequencies. To receive digital intelligence, it is necessary to recognize a series of "zeros and ones" or dots and dashes. This is made easy in my system by knowing when to look, and what to look for.

There is provided, moreover, a decision making receiver system in which conventional hardware modules are combined in a novel manner to give extremely good suppression and balancing of background noise and good suppression of foreign or spurious frequencies on each channel. This is accomplished by taking advantage of foreknowledge of the intelligence frequencies, and of their coherent character. Thus it is possible to develop the bit timing synchronization over a long period, so that the starting time for each bit is known. Knowing the starting time of each bit, it is possible to perform the integration over such an interval that optimum rejection of foreign frequencies is realized.

Using a separate detector, for each channel, it is possible to stabilize these detectors with long time constants, giving extremely narrow noise bandwith, while still responding rapidly to a new bit of intelligence through discharging the integrating capacitors at the optimum moment by the use of the slaved coherent clock and programmer circuitry.

As defined in method terms, a decision making method is thus provided for determining which of received frequency shift keying signals having coherently related signal and keying frequencies is being received at any time, such method comprising the steps respectively of operating at the receiver a plurality of local oscillators initially at the known frequencies of the signals, separately amplifying each of the received signal frequencies and continuously tuning each amplifier for maximum gain thereby to follow variations in the received frequency, servoing the oscillators to follow the amplified signal frequencies in phase therewith, heterodyning the oscillators against each other to reconstruct the keying frequency, detecting and integrating the amplified signals repetitively at the rate of the reconstructed keying frequency thereby to determine the strengths of the signal frequencies at the end of each integrating period, setting the integrating period equal to an integral multiple of the reciprocal of the difference between any two of the signal frequencies, comparing the strength of each integrated signal frequency with that of the others, and producing an output signal for each integrated signal frequency whenever its strength compared to that of the others is greater.

Suitable means designated 24 and comprising recording and display equipment is provided for displaying and recording in digital and/or analog form the output information received from amplifier 23. For this purpose, a strip chart recorder may be employed to display and record the digital information directly, and a second such recorder may be employed together with a suitable digital to analog converter and de-commutator to display and record the received information in analog form.

The sensitivity of the logging while drilling system as thus far described may be further enhanced by use of the aforementioned transponder units 13 in the drill string to reinforce the signal frequencies transmitted via the acoustic link afforded by the drill pipe. For this purpose, the transponder units 13, FIGS. 1 and 4, may be generally similar to the transmitter unit 12 and similarly comprises one or more modules for housing the batteries 25, transducer 19, gated signal generators 18, coherent receiver 23, and geophones 22, as disclosed schematically in FIG. 2. Although substantially similar, their transducer modules, for example, being substantially identical, the transponder units 13 differ from the transmitter unit 12 in that the geophones and coherent receiver are used in the transponder unit in lieu of the sensors, commutator, and voltage digitizer or encoder used in the transmitter unit, as may best be seen by reference to FIG. 4. The gated signal generators 18 of the two units may also differ somewhat in that the clock frequency generator required in the transmitter unit need not be used in the transponder unit wherein the coherent receiver 23 is substantially the same as that employed in the surface receiver and thus derives the clock frequency $f_c$ from the received transmission frequencies. The geophones 22 employed in the transponder units may be substantially identical to those used with the surface receiver.

When the transponder units 13 are used in the operation of the logging while drilling system of the present invention, two types of transponder units must be used and inserted alternately into the drill string, these being referred to as high and low frequency band units. The magnetostrictive transducer of the high band unit, for example, may transmit the aforementioned 98, 100, and 102 cycle frequencies in response to transmission frequencies of 78, 80, and 82 cycles received by the geophones of this unit. The magnetostrictive transducer of the low band unit, on the other hand, will transmit the 78, 80, and 82 cycle frequencies in response to the 98, 100, and 102 cycle frequencies received by its geophones. An ample spread between the high and low frequency bands is desirable in order that the geophones of one unit will be effectively de-tuned with respect to the frequencies transmitted by this unit. The surface receiver geophones must likewise be alternated between high and low band types, and the input circuits to the coherent receiver at the surface, moreover, must be capable of shifting or transferring between high and low band frequency response, as by providing two sets of input circuits and switching between these circuits as the transponder units are alternated.

Referring now to FIG. 3, it may thus be seen that the frequencies $f_0$, $f_1$ and $f_2$ received by the geophones 22 may be 98, 100, and 102, and the clock frequency $f_c$ derived from coherent receiver 24 may be 1 cycle per second. The gated signal generators 18 in this case will comprise a 40 cycle oscillator, modulator and filters comprising the signal generator 26 which heterodynes with the 1 cycle clock frequency $f_c$ to provide the sum and difference frequencies 41 and 39 cycles. These frequencies, together with the 40 cycle frequency, are designated $f_0'$, $f_1'$, and $f_2'$ and are respectively supplied via the gates 27, 28, and 29, when the same are opened by the output voltages appearing on receiver 24, to the power amplifier 30. These amplified transducer frequencies are then applied to the magnetostrictive transducer 19 which will double these frequencies to produce the aforementioned transmission frequencies 78, 80, and 82 cycles per second.

Referring again to FIG. 1, it will be seen that the transponder units 13 are spaced closer together near the surface where the noise incident to the drilling operation is greater. Those disposed in the drill string near the bit 11 may be spaced distances of the order of 2000 feet, for example, whereas near the surface, the spacing between units may be of the order of 500 feet. Thus, as depth intervals of 500 feet are drilled initially, transponder units of the alternate types will be inserted into the drill string. When it becomes necessary to withdraw the string, as occurs in practice, upon re-building the string for resumption of drilling, the transponder units of the alternate types are now inserted at the 2000 foot intervals, as required, to cover the depth of the drill pipe string in excess of the first 500 feet below the surface. Thereafter, the transponder units are again inserted at the 500 foot intervals, as the drilling progresses, as disclosed in FIG. 1.

From the foregoing, it should now be apparent that a coherent decision making logging while drilling system and method with exemplary embodiments and variations has been provided which is well adapted to fulfill the aforestated objects of the invention. It is to be understood, however, that the invention may be embodied in other forms or carried out in other ways without departing from the spirit or essential characteristics thereof. Mud turbine driven generators, for example, may be employed, when desired, in lieu of the battery modules hereinbefore specified. The embodiments of the invention hereinbefore disclosed therefore are to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. In a logging while drilling system of the character disclosed, the combination of a drill pipe string, a drill bit at the bottom of the drill pipe string, means disposed within the drill pipe string at or near the drill bit for generating pre-arranged and coherently related frequency shift keying signals representative of a plurality of measured parameters of interest in the well, electroacoustical transducer means structurally integrated within the drill pipe string for transmitting said signals to the surface acoustically therethrough, and coherent decision making receiver means disposed at the surface for receiving said transmitted signals and comparing their relative signal strength each with the others thereby to determine which of the signals is being received at any time.

2. In a logging while drilling system of the character disclosed, the combination of a drill pipe string, a drill bit at the bottom of the drill pipe string, transmitter means including an electroacoustical transducer disposed within the drill pipe string at or near the drill bit for generating and transmitting acoustically to the surface through the drill pipe pre-arranged and coherently related frequency shift keying signals in digital form and representative of a plurality of measured parameters of interest in the well, and coherent decision making receiver means disposed at the surface for receiving said transmitted signals and comparing the signal strengths thereof each with the others and repetitively at the keying frequency thereby to determine which of the signals is being received at any time.

3. In a logging while drilling system of the character disclosed, the combination of a drill pipe string, a drill bit at the bottom of the drill pipe string, transmitter means including an electroacoustical transducer disposed within the drill pipe string near the drill bit for generating and transmitting acoustically to the surface through the drill pipe pre-arranged and coherently related frequency shift keying signals in digital form and representative of a plurality of commutated analog voltages corresponding to measured parameters of interest in the well, coherent decision making receiver means disposed at the surface and comprising a plurality of tuned signal channels individual to the transmitted signal frequencies for detecting and comparing the same each with the others repetitively at the keying frequency and for producing an output voltage for each of the signals whenever its strength as compared to the others is greater, and display means including a first recorder for displaying and recording the output voltages of said signal channels in digital form, said display means including a second recorder and associated digital to analog converter and de-commutator for displaying and recording said output voltages in analog form.

4. In a logging while drilling system of the character disclosed, the combination of a drill pipe string, a drill bit at the bottom of the drill pipe string, transmitter means including an electroacoustical transmitter transducer disposed within the drill pipe string near the drill bit for generating and transmitting acoustically through the drill pipe pre-arranged and coherently related frequency shift keying signals representative of measured parameters of interest in the well, at least one transponder unit disposed within the drill pipe string between said transmitter means and the surface for receiving and reinforcing the signal frequencies transmitted by said transmitter transducer, geophone means acoustically coupled to said drill pipe string at the surface and responsive to said reinforced transmission frequencies, and coherent decision making receiver means comprising a plurality of signal channels operatively coupled to said geophone means and responsive individually to said transmission signal frequencies for detecting, integrating, and comparing the signals each with the others and repetitively at the keying frequency thereby to identify and determine which of the signals at any time has the greatest signal strength.

5. A logging while drilling system as in claim 4, said transponder unit having signal receiving geophone means similar to said geophone means disposed at the surface and signal transmitting transducer similar to said transmitter transducer.

6. In a logging while drilling system of the character disclosed, the combination of a drill pipe string, module data collection and transmitter apparatus mounted within a section of said pipe string for generating and transmitting acoustically through the drill pipe pre-arranged and coherently related frequency shift keying signals in digital form and representative of a plurality of commutated voltages corresponding to measured parameters of interest in the well, module electroacoustical transponder apparatus mounted within a section of said pipe string for reinforcing said transmitted signals and transmitting the same to the surface, and coherent decision making receiver apparatus disposed at the surface and coupled electroacoustically to the drill pipe string for detecting and comparatively measuring the received transmission frequencies repetitively at the keying rate, thereby to determine which of the signal frequencies is being received at any time.

7. In a logging while drilling system as in claim 6, said transmitter and transponder apparatus having substantially identical electroacoustical transducers for transmitting the signal frequencies, said transponder and receiver apparatus having substantially identical geophone and coherent receiver means for receiving and detecting the transmitted signal frequencies.

8. In a logging while drilling system as in claim 6, said transponder apparatus comprising transponder units of high and low frequency band types disposed alternately at intervals along the drill pipe string, and said receiver apparatus comprising high and low frequency band input circuits adapted for acoustical coupling selectively to the drill pipe string according to the transponder unit type inserted thereinto nearest the surface.

9. In a logging while drilling system as in claim 7, said coherent receiver means of the transponder and receiver apparatus comprising means for reconstructing the keying frequency from the transmission signal frequencies.

10. A drill pipe module electroacoustical transponder unit for receiving and transmitting frequency shift keying signals comprising a transducer, geophone for receiving said signals, a decision making coherent receiver acoustically coupled to said geophones and including means for reconstructing the keying frequency from the received signal frequencies, signal generator means constructed and arranged for heterodyning with the keying frequency to produce a set of transmission frequencies which differ from said received frequencies, and gate means responsive to the output of said coherent receiver for applying said produced set of frequencies to said transducer for transmission thereby.

11. A transponder unit as in claim 10, said transducer comprising two sections of drill pipe joined end to end with an elastic adhesive connection providing a compliant gap therebetween, said connection affording structural strength and integrity and free floating vibration of the sections relative to each other at said set of acoustical transmission frequencies, and electroresponsive means connected to said sections and disposed in briding relation to said gap for vibrating the sections at said frequencies.

12. A transponder unit as in claim 11, said electroresponsive means comprising a magnetostrictive core having a winding thereon.

13. A drill pipe module transponder unit for operation within a drill pipe string and comprising geophones and a drill pipe sonic transmitting transducer for respectively receiving and transmitting through the drill pipe string in the form of frequency shift keying signals a series of binary numbers corresponding to parameters of interest in a well, each of said numbers comprising a series of "1" and "0" bit values, and means responsive to said geophones for selectively driving the transducer at signal frequencies corresponding to said binary values.

14. A transponder unit as in claim 13, said signal frequencies received respectively by the geophones and transducer comprising different bands of frequencies having sufficient spread therebetween to avoid response of the geophones to the signals transmitted by the transducer.

15. A logging while drilling system comprising, in combination, a drill pipe string, a plurality of sensors disposed near the bottom of said pipe string for producing analog voltages representing the measurement of parameters of interest in a well, a commutator mounted within said pipe string responsive to said analog voltages and having an output for presenting the same in serial form, analog-to-digital converter means connected to said commutator output for converting said serial voltages into a series of binary numbers each comprising a series of "1" and "0" bit values, a drill pipe sonic transducer integrated structurally and acoustically into the drill pipe string, means for selectively driving said transducer at frequencies corresponding to said binary values and in the form of frequency shift keying signals thereby to transmit said original frequencies to the surface through the drill pipe string, and a coherent decision making receiver coupled electroacoustically to the drill pipe string at the surface for receiving said transmission signals and reproducing said series of "1" and "0" bit values therefrom in the form of output voltages repetitively at the keying frequency.

16. A logging while drilling system as in claim 15 and further comprising display and recording means for displaying said output voltages in digital and analog form.

17. A logging while drilling system as in claim 15, said coherent receiver comprising self tuning signal channels for respectively receiving said transmission signals, said channels respectively comprising phase locked detectors for servoing the received signal frequencies and reproducing the keying frequency therefrom, said channels respectively comprising integrators for accumulating the detected signals during intervals initiated by the reconstructed keying frequency, and said channels respectively having comparators for comparing the voltage level of the integrated signal frequencies each with that of the others and for producing an output voltage for each channel whenever the voltage level of its integrator is greater than that of the others.

18. The method of logging while drilling which comprises the steps of drilling a well with a modular drill pipe string, concurrently with said drilling operation sensing and measuring from one of the pipe modules a plurality of parameters of interest in the well, acoustically transmitting to the surface via the drill pipe string prearranged and coherently related frequency shift keying signals representative of the measurements of said sensed parameters, receiving and detecting said transmitted frequency signals at the surface, and comparing said detected signals each with the others and repetitively at the rate of the keying frequency to determine which of the detected signals is being received at any time.

19. The method of logging while drilling a well comprising the steps of concurrently drilling, collecting parameter data, and electro-acoustically transmitting and transponding to the surface through the drill pipe digital information in frequency shift keying form and representative of said parameter data, and detecting, displaying and recording said digital information at the surface and repetitively at the rate of the keying frequency.

20. The method of logging while drilling in an oil well which comprises the steps of concurrently drilling and electroacoustically transmitting and transponding at intervals along the drill pipe coherently related frequency shift keying signals representative of measured parameters of interest in the well, and determining at the surface and repetitively at the rate of the keying frequency which of the keyed, transmitted, transponded, and received signal frequencies is being received in predominating strength at any time.

21. The method of logging while drilling in an oil well which comprises the steps of concurrently drilling the well, collecting, measuring, and sampling data in analog form relating to parameters of interest in the well, converting the analog data to a series of binary numbers, generating coherently related frequency shift keying signals representative of said binary numbers, transmitting said signals to the surface along the acoustic link afforded by the drill pipe, and detecting, comparatively measuring, and presenting said transmitted signals at the surface in digital form repetitively at the frequency keying rate.

22. The method of logging while drilling which comprises the steps of concurrently drilling the well, measuring and converting parameters of interest in the well to D.C. voltages, converting said D.C. voltages to digital form through a commutator, electrically generating a coherently related and pre-arranged set of data frequencies and rates for electroacoustical transmission of said digital information by frequency shift keying, coupling and radiating the keyed transmission frequencies into the drill pipe for efficient use of the same as the acoustic link to the surface, reinforcing and transponding the signals transmitted along the drill pipe at intervals over the length of the drill pipe string, receiving the transmitted and transponded signals from the drill pipe string at the surface, self-tuning surface disposed oscillators to the received signal frequencies, reconstructing the keying frequency from the self-tuned oscillator frequencies, integrating the received signal frequencies repetitively at the rate of the reconstructed keying frequency, comparing the integrated signal frequencies each with the others at the end of each integrating period, producing an output voltage for each of the integrated signal frequencies whenever is strength compared to the others is greater, and recording and displaying said output voltages in digital and analog form.

References Cited by the Examiner

UNITED STATES PATENTS 3,015,801 1/62 Kalbfell _____ 340—18
3,079,549 2/63 Martin _____ 340—18 X BENJAMIN A. BORCHELT, *Primary Examiner.*

SAMUEL FEINBERG, KATHLEEN H. CLAFFY,
*Examiners.*